United States Patent [19]
Hoganson

[11] 3,930,415
[45] Jan. 6, 1976

[54] MOTION CONVERTER
[76] Inventor: Eugene Hoganson, 16517 Canterbury Drive, Minnetonka, Minn. 55343
[22] Filed: Jan. 16, 1975
[21] Appl. No.: 541,529

[52] U.S. Cl. .......................... 74/84; 74/437; 74/25
[51] Int. Cl.² .......................................... F16H 27/04
[58] Field of Search............ 74/437, 424.8 R, 74, 84

[56] References Cited
UNITED STATES PATENTS
| | | | |
|---|---|---|---|
| 1,159,463 | 11/1915 | Barr et al............................. | 74/437 |
| 3,769,946 | 11/1973 | Scherrer ............................. | 74/437 |

*Primary Examiner*—Benjamin W. Wyche
*Assistant Examiner*—Wesley S. Ratliff, Jr.
*Attorney, Agent, or Firm*—James R. Cwayna

[57] ABSTRACT

A motion converter device capable of converting continuous rotary input motion to cyclic linear motion and capable of accomplishing the reversal thereof from cyclic linear motion to continuous rotary motion including means for substantially smoothly obtaining the conversion. The unit includes a set of gear trains having gears of a selected shape and which gear trains are intermeshed from either a single rotary shaft or a plurality of linked output shafts which interwork to convert the rotary motion of the single shaft to oscillatory or linear motion of the output shafts or will, in the reverse of this procedure, convert a linear input to the plurality of shafts to rotary motion of the single shaft.

12 Claims, 5 Drawing Figures

MOTION CONVERTER

FIELD OF THE INVENTION

This invention relates generally to devices which will convert a rotary motion to a linear cyclical motion or alternatively will convert the linear motion to a rotary motion and through the device utilized herein, the cylic variations in output of either the linear motion or the rotary motion will be minimized.

BACKGROUND AND OBJECTS OF THE INVENTION

The desire for the conversion of rotary motions to cyclic linear motions or the reverse has realized its value in various arts. The object of several of these arts has been to pump or deliver fluid with a mechanical rotary input and conversely, to rotate a shaft with a cyclic linear input force. In many of these devices, the pressure flow and torque-speed concept is of primary importance and the ability to provide a smooth power transmission during the conversion process has also been a problem. With applicant's device the basic objects are to provide a mechanism that may be operated at relatively rather low speed and a unit wherein the timing situation is automatically compensated for by the motor output-speed demands if necessary.

The basic object of applicant's invention is to provide a device which will convert rotary motion to a cyclic linear motion but wherein the cyclical situation will not provide a horsepower ripple that would result in any deterring factors.

It is a further object of applicant's invention to provide a unit which is capable of converting a linear input whether the input be mechanical or by other means, to a rotary output.

It is a further object of applicant's invention to provide a motion converting device which is capable of utilization as a pump or motor but which more important thatn that consideration is the conversion of a linear motion to a rotary motion.

It is still a further object of applicant's invention to provide a motion converting device capable of converting linear to rotary or rotary to linear motion with a minimal energy transformation ripple.

These and other objects and advantages of the invention will more fully appear from the following description made in connection with the accompanying drawings in which the same numeral is used to designate the same or similar parts throughout the several views, and in which.

Figure 1:
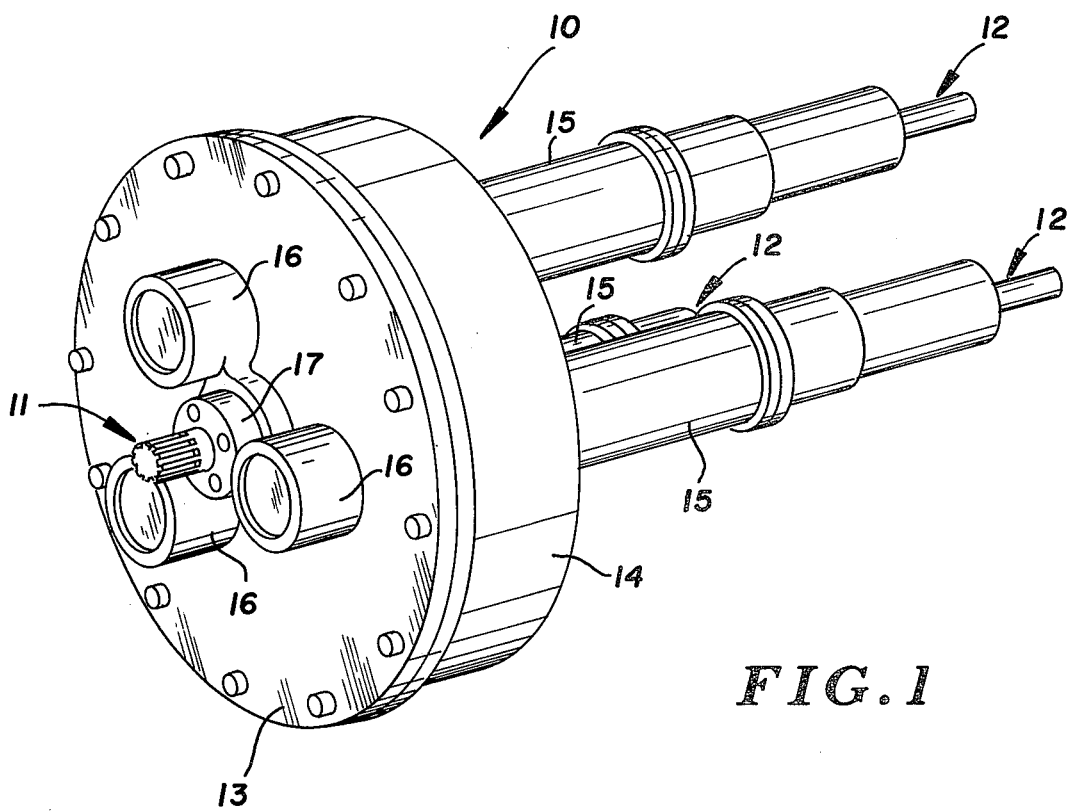
FIG. 1 is a perspective view taken from one end of a motion converter embodying the concepts of applicant's invention.
Figure 2:
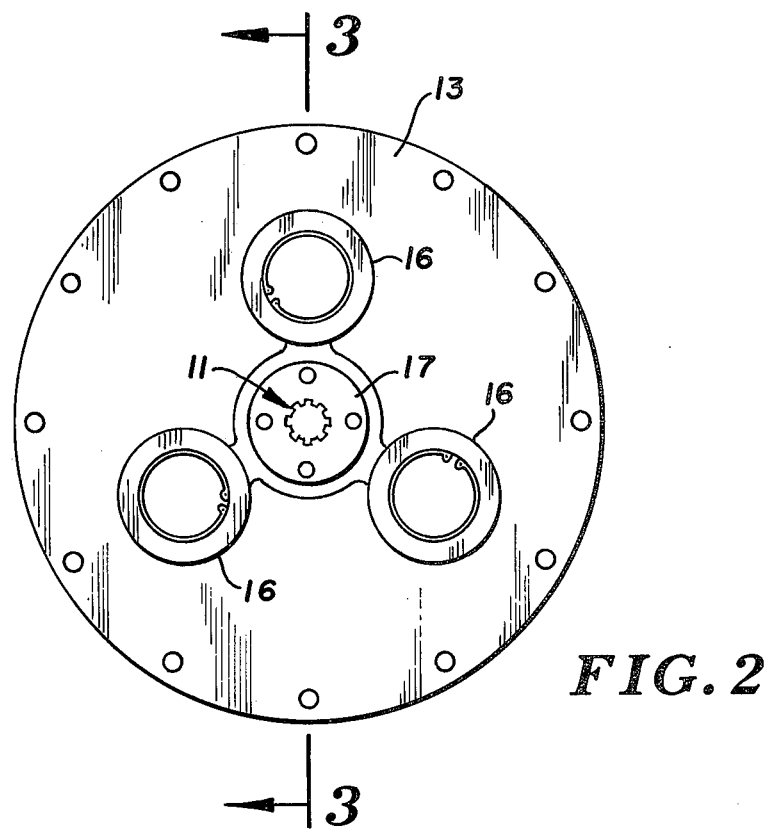
FIG. 2 is an end view taken from the same end as that of FIG. 1.

In accordance with the accompanying drawings, applicant's motion converter is generally designated 10 and for the purposes of the disclosure of this invention the unit is provided with a single rotary motion input or output shaft 11 and three linear motion input or output shafts which are commonly designated 12. The reason for the utilization of this common designation for these linear input or output shafts 12 is that applicant has provided a common construction for these shafts and for the housings therefore and these shafts are simply arcuately spaced within the housings. The utilization of these shafts will substantially even out the motion conversion ripple and this motion ripple could be further controlled by increasing such shafts but such an increase would require only a mechanical variation in applicant's device. With the unit as illustrated herein, applicant believes that a sufficient disclosure is given to those skilled in the art which would allow them to utilize his concepts without regard to shaft numbers. Therefore, in the description as included hereinafter, until a consideration of the required gearing is given for three such units, it should be understood that the housing and various features and functions of all of the linear motion shafts 12 is identical.

In accordance with applicant's drawings, a housing for the motion conversion unit 10 is provided and this housing includes frontal housing portion 13 and a rear housing portion 14 having additional housings 15 extending therefrom for the positioning and support of the linear output shafts 12. Bearing housing portions 16 are further provided on the front housing portion 13. Housing means for the rotary input and output shaft 11 is designated 17 and is arranged generally centrally of the three bearing housings 16. Obviously means must be provided for sealingly connecting these housing portions 13, 14 together.

Figure 3:
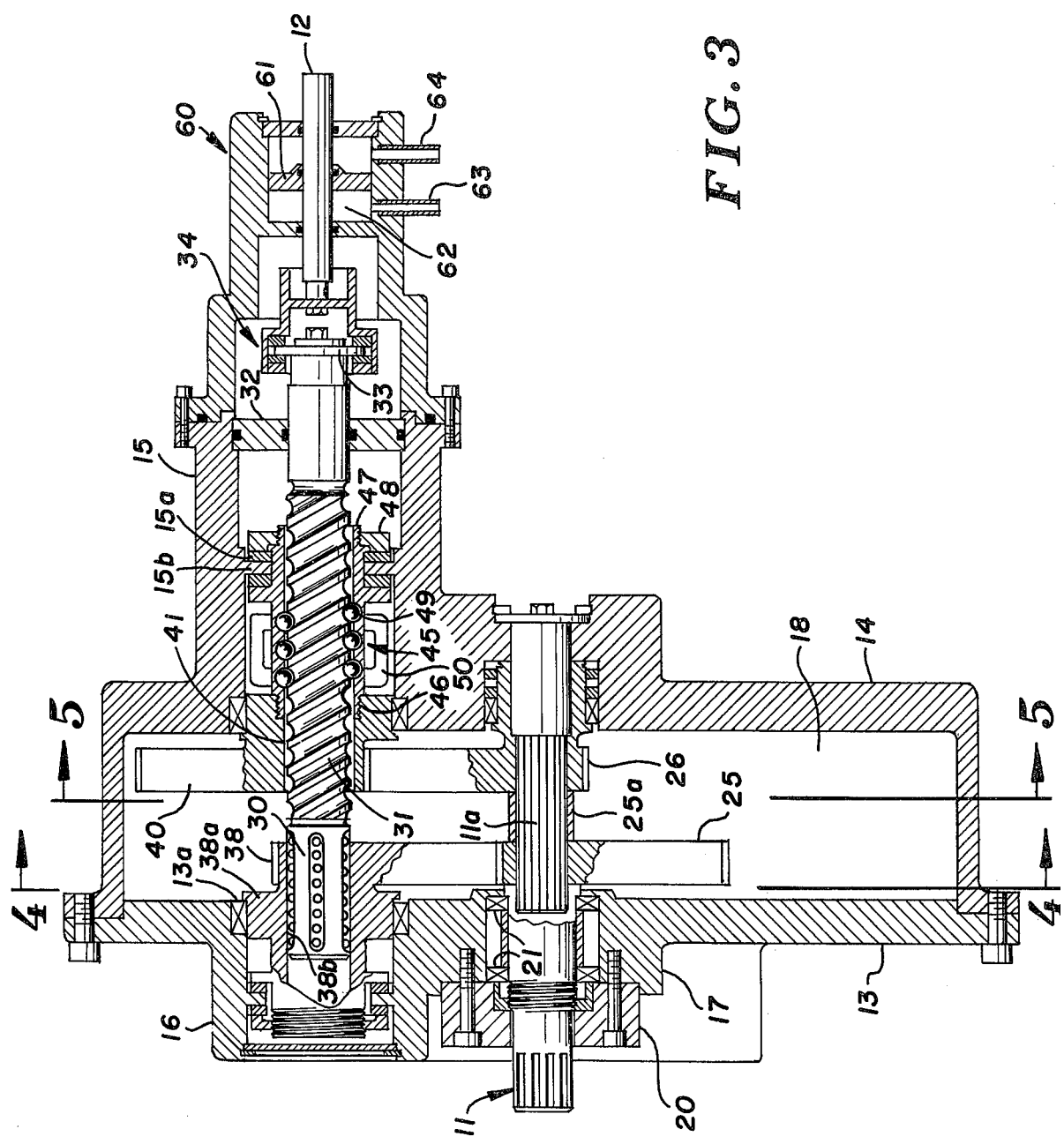
FIG. 3 is a section taken substantially along line 3—3 of FIG. 2.

As particularly illustrated in FIG. 3, housings 13, 14 are formed to provide a gear casing and gear housing area 18 therebetween.

The rotary shaft member 11 is of a generally cylindrical construction and this member extends into and through the housing portion 13 and is captured therein by a housing member 20 and bearings 21 are provided within the housing portion 13 to properly position the same and allow for rotation thereof. Again, during this description it should be considered that transmission and bearing design is not necessarily new to the art and the means for mounting shafts for proper driving thereof does not form or provide a particular basis for this invention and minimal discussion will be given to the aspect of various mounting arrangements necessary to accomplish proper rotation of shafting and the like or for oil sealing thereof, but rather the primary disclosure of this application will be directed to the features that are deemed to be novel.

Figure 4:
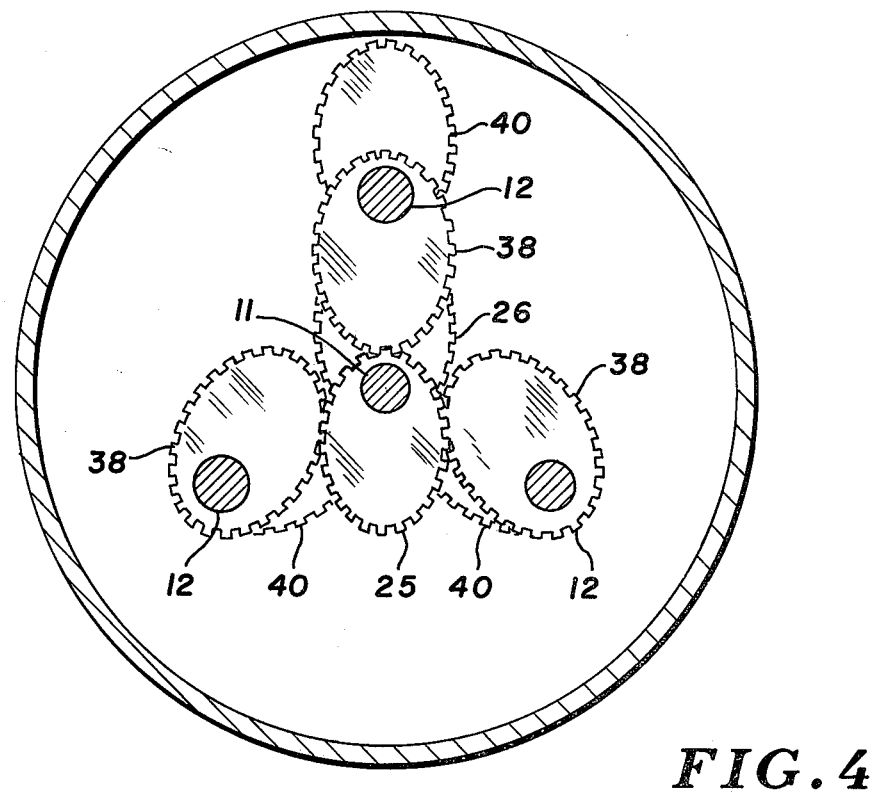
FIG. 4 is a vertical section taken substantially along Line 4—4 and partucularly designating the gear train arrangements and the relationships therebetween; and, FIG. 5 is a vertical section taken substantially along Line 5—5 of FIG. 3 and illustrating a single set of gears in the gear train.
Figure 5:
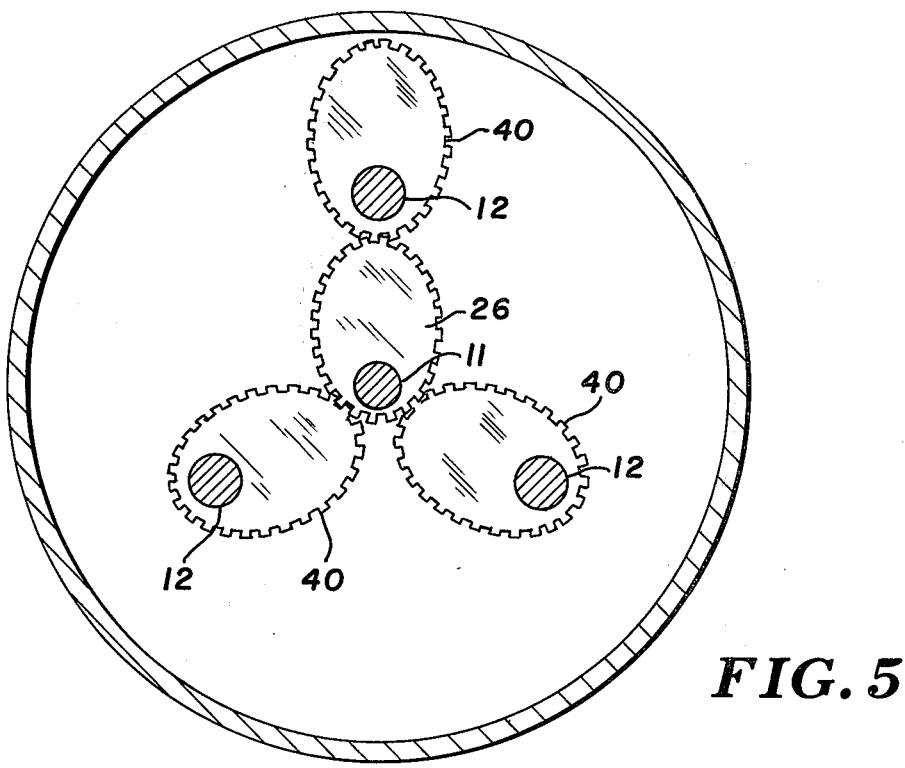

Input shaft 11 is provided with a first elliptical gear 25 which is secured for rotation with and to the shaft 11. It should be noted that shaft 11 may be splined as at 11a for positive driving of this gear 25 and a second gear member 26 is also positioned on the splined portion 11a which gear 26 is positioned in spaced relationship to the gear element 25. The particular relationship of these gears 25, 26 is illustrated in FIGS. 4 and 5 where it should be noted that these gears are of elliptical design with an eccentric mounting and which are 180° out of phase with one another. This same consideration provides for eccentrically arranged gears of curcular configuration or concentrically arranged gears of oval configuration.

As illustrated in FIG. 3, means must be provided for proper mounting of the driving shaft 11 in the housing member 14 and further means must be provided to retain gear 26 in proper spaced apart relationship from gear 25. This spacing may be accomplished through various devices: one such simple device being the provision of a spacer 25a between the gears 25, 26. In this construction it is desirable that a beam type of construction rather than a cantilever construction be utilized for mounting these gears 25, 26 and again, anyone skilled in the art may easily accomplish this type of strength design.

Obviously, when shaft 11 is rotated, gears 25 and 26 will rotate and in the opposite consideration, when rotary force is applied to gears 25 and/or 26, shaft 11 will rotate.

At this point, consideration should be given to FIG. 3 which discloses and shows only one of the three output shaft constructions 12 and their individual housings 15. A consideration must also be made of FIGS. 4 and 5 at this time. As has been previously indicated, the output shafts 12 are common to each of the selected number of linear motion shafts and the construction that will be discussed hereinafter is applicable to the various gearing and shafting for each of such shafts.

As illustrated in FIG. 3, the output shaft 12 includes what is known in the art as a linear ball spline section 30 adjacent one end thereof and a ball screw section 31 immediately adjacent thereto on a common shaft area which shaft extends through a sealing plate 32 arranged in housing 15 and which is further provided with a radially extending shoulder 33 thereon which radially extending shoulder 33 is captured in a thrust bearing housing designated in its entirety 34 which will permit rotation of this shaft section and will also accommodate and provide its linear movements. The housing section 34 is then attached to the output shaft designated 12, but it should be stated that this entire shaft structure is a continuous unit with what may be termed a universal connecter 34 at a portion thereof which will allow rotary and longitudinal motion of selected portions thereof.

Beam mounting for this shaft 12 is obtained by providing a first gear member 38 again being elliptical in shape and eccentrically mounted or circular in shape and eccentrically mounted or oval in shape and concentrically mounted; arranged and having teeth about the periphery thereof, which will mesh with gear 25 and further having a bearing shoulder surface 38a thereon which will be received into an appropriate bearing surface 13a in housing portion 13 with means being provided to properly position this gear 38 within the housing member 13 such that the teeth thereof will properly mesh with the gear 25. Again, the particular construction to properly seat this gear within housing 13 and provide for such teeth meshing is felt to be obvious to one skilled in the art.

The gear unit 38 is provided with an internal passage 38b having what are termed as ball-splined grooves therein which will receive the ball-splined, longitudinally extending area 30 of shaft 12. This structure will provide for proper beam mounting of the shaft 12, but will also permit shaft 12 to longitudinally reciprocate within the gear 38 while maintaining rotary driving mesh therewith. It should be obvious from this description that upon rotation of the shaft 11, rotary motion will be imparted to gear 25 and thus to the meshed gear 38 and therefore to the shaft 12. It should also be noted that as this is an elliptical gearing arrangement, the speed and torque considerations will vary as rotary positions of the shaft 11 and the respective gears 25, 38 are evolved. When considering the illustration of FIG. 4, it will be seen that these speed and torque variations between the illustrated three such gearing units will vary independently from the longitudinal motion of shafts 12 while the shaft 11 is running at a constant speed. This same situation can be considered from a torque situation in which the torque transfer is opposite to the speed transfer.

A second gear 40 is arranged about the ball screw portion 31 of shaft 12 and it should be noted that an internal passage 41 is provided through this gear 40 to permit longitudinal motion of shaft 12 therethrough. A ball nut member designated in its entirety 45 is positioned about the ball screw portion 31 of shaft 12 and has one end thereof secured to the gear 40 while its other end 47 is positionable with respect to the housing 15 through a capturing element 48. Obviously thrust bearings 15a and a shoulder 15b must be provided for the axial positioning of this unit. With this ball nut 45 so connected to the gear 40 it is obvious that this unit will rotate as a combined unit.

As is well known in the art, the idea of a ball nut is to provide a defined path of a plurality of balls 49 about an externally machined thread on a shaft and the continuity of this path is provided through an external path defining portion 50. The concept of this unit is that a relatively low friction type of device can be provided by having the balls act as the thread engaging or thread providing situations rather than have machine threads operate against machine threads as in a standard nut and bolt.

One of the basic concepts of applicant's invention lies in this screw-nut philosophy. If a bolt is turned clockwise in a right hand threaded bolt-nut assembly, and the nut is restrained from rotating, the bolt will advance through the nut axially. If the nut is turned clockwise and restrained from axial movement, and the bolt is restrained from rotating, the bolt will retract through the nut axially. It is to be noted that the linear motion of the bolt was reversed while the direction of rotation imparted to first the bolt and then the nut was unchanged; i.e., clockwise rotation imparted to each the bolt and nut.

If clockwise rotation is imparted to the bolt and nut simultaneously, and the rotational speeds of the bolt and nut are identical, there will be no axial motion of the bolt with respect to the nut. If the bolt has a greater rotational speed than the nut, the bolt will advance through the nut. If the nut has a greater rotational speed than the bolt, the bolt will retract through the nut. It is this concept of applicant's invention that allows the conversion of rotary motion of shaft 11 to linear motion of the shafts 12 and likewise provids the opposite effect when linear axial forces are imposed on shafts 12 to impart rotary motion to shaft 11. A piston, driving construction is provided on the ends of shafts 12 and is designated 60. This construction may include a piston 61 arranged within cylinder 62 with hydraulic fluid means or the like 63, 64 being directed to opposite sides of the piston 61. Obviously this construction 60 would be provided on each of the shafts 12 and a valving mechanism which provides for proper sequential introduction and escape of fluid from either side of the piston 61 is necessary to induce the linear motion to the shafts 12. It should be noted that linear motion to the shafts 12 and the connected pistons 61 would provide pumping to the fluids within the cylinders. This piston construction is illustrated as one means for inducing or utilizing the linear movement of the shafts 12 but it should be obvious that mechanical camming devices could operate against the ends of shafts 12 and produce or utilize this movement. Again it should be noted that although the applicant has illustrated three of the shafts 12 with the various gear trains thereon, that a greater number of such shafts could be provided without departing from the scope of the invention.

The operation of the unit, without regarding torque philosophies or the like and assuming that a conversion from rotary to linear cyclical motion is desired is as follows:

Rotary motion is applied to the input shaft 11. This will cause gears 25 and 26 to rotate in the direction of rotaion of the shaft 11. As illustrated in FIGS. 4 and 5, the gears 38 and 40 meshing with gears 25, 26 will through the eccentricity and elliptical configuration of the gears will be driven at changing speeds resulting in the axial movements of shafts 12. During a certain portion of rotation of gears 38, they will be driven more rapidly than the gears 40 and the attached ball nut units 45 such that the shafts 12 will be driven in one axial direction over one half of such gear rotation and over the next half of the gear rotation the opposite relative movement of the gears 38, 40 will result thus providing an axial driving force to shafts 12 in an opposite direction. Basically the gear arrangement in connection with the ball nut accomplishes what has been previously explained for a nut and bolt.

The same results are obtained when an application of a linear force is made to the shafts 12. Driving of these shafts in one direction will cause rotation of the ball nut 45 and gear combination 40 at a certain speed and the retardation of such motion due to partial holding of this ball nut-gear combination will result in rotation of shaft 12 thus driving gear 38. This rotation will obviously deliver rotation to the gears 25, 26 and shaft 11. Reversing of the linear driving forces to the shafts 12 will continue these same rotary effects to gears 38, 40 and the speed of rotation of these gears in combination with the ball nut 45 provides a continuing rotary driving effect. It should be obvious to anyone skilled in the art that a plurality of shafts 12 is necessary to control the cyclical output. One such shaft would provide the necessary motion conversion but the transfer would be by surges rather than being a smooth flow.

Applicant has provided herein a unique device which provides for the smooth conversion of either rotary or linear motion to linear or rotary motion through the utilization of a relative speed of rotation concept in conjunction with a linear force application and it should be obvious that modification of this device by, for example, increasing the linear shafts could increase the smooth conversion of motion without departing from the scope of the invention.

What I claim is:

1. A motion converting device including:
   a. a housing defining a gear receiving cavity therein;
   b. a first shaft member arranged for rotation and extending into said cavity;
   c. a first pair of gear members arranged on said first shaft within said cavity for rotation with said first shaft, said gear member being arranged for rotation on said shaft;
   d. at least one second shaft extending into said cavity and being arranged for rotation therein;
   e. a second pair of gear members arranged on said second shaft within said cavity for rotation with said second shaft, said gear members being arranged for engaging said first pair of gear members;
   f. said second shaft having a splined driving section and being longitudinally shiftable with respect to one of said second pair of gear members; and,
   g. said second shaft having a threaded section and the other of said second pair of gear members threadably arranged thereon.

2. The structure set forth in claim 1 and said first pair of gear members including elliptical gears being eccentrically arranged on said first shaft.

3. The structure set forth in claim 1 and said first pair of said gear members being mounted on said first shaft in 180° opposed relation.

4. The structure set forth in claim 1 and said splined section of said second shaft including externally formed splines on said shaft, internally formed splines on said engaging gear and ball members arranged in mating relation therebetween to permit relative longitudinal motion between said shaft and said gear while maintaining the rotational motion thereof.

5. The structure set forth in claim 1 and said threaded section of said second shaft including a ball nut member surrounding the same and connected to said gear arranged therearound to provide longitudinal motion of said second shaft upon rotation of said gear and providing rotation of said gear upon longitudinal motion of said second shaft.

6. The structure set forth in claim 1 and at least a pair of said second shafts, each such shaft having pairs of second gears thereon.

7. The structure set forth in claim 6 and said gears on said second shafts including elliptical gears, each of said gears being in constant mesh with said gears on said first shaft.

8. The structure set forth in claim 1 and means for imparting and receiving linear motion of said second shafts.

9. The structure set forth in claim 8 and said means for imparting and receiving linear motion of said second shafts including a piston member arranged on said shafts, a cylinder surrounding said piston for actuation therein and fluid control means directing and receiving fluid to and from said cylinder on opposite sides of said piston.

10. The structure set forth in claim 1 and a plurality of second shafts arcuately spaced about said first shaft and each of said second shafts having pairs of second gear members thereon which second gear members are in constant mesh with said first pair of gear members.

11. The structure set forth in claim 1 and said first pair of gear members including oval gears being concentrically arranged on said first shaft.

12. The structure set forth in claim 1 and said first pair of gear members including circular gears being eccentrically arranged on said first shaft.

* * * * *